Feb. 25, 1947.    R. H. STEVENS ET AL    2,416,653
FLYING HOT SAW
Filed Nov. 13, 1942    14 Sheets-Sheet 8
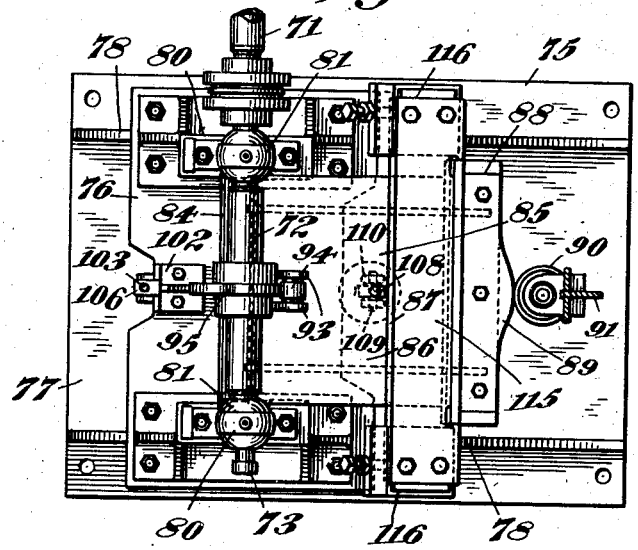
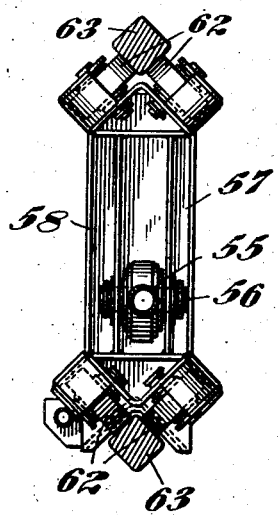
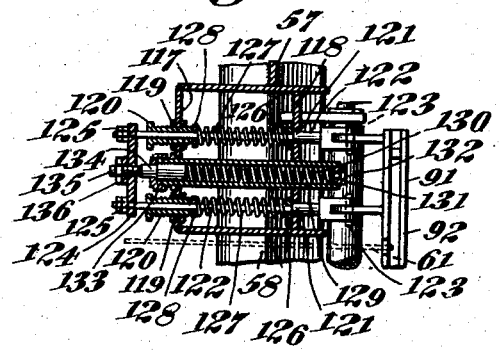
Inventors
Richard H. Stevens
and Tom Wilson.
By R. S. A. Dougherty.
Attorney Feb. 25, 1947. R. H. STEVENS ET AL 2,416,653
FLYING HOT SAW
Filed Nov. 13, 1942 14 Sheets-Sheet 9
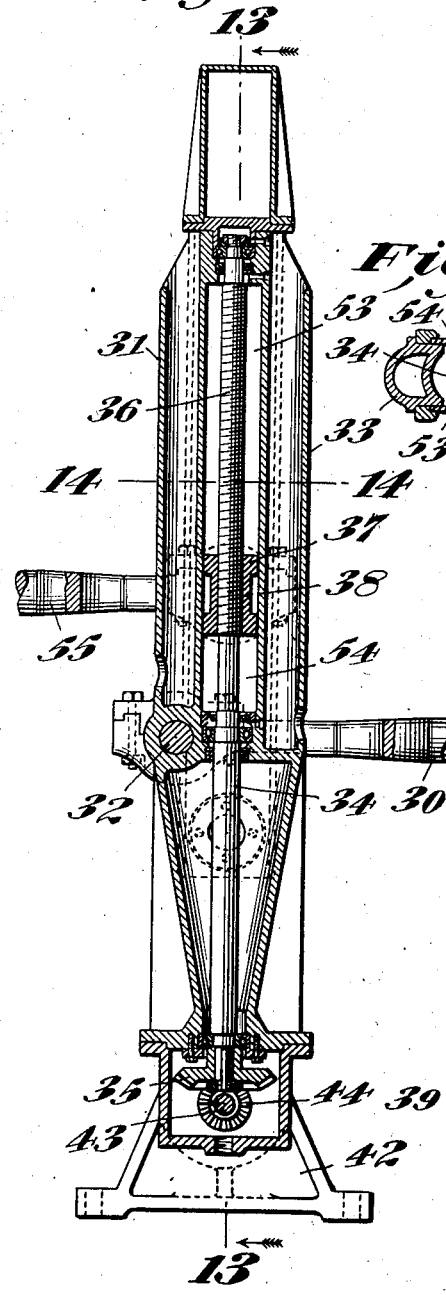
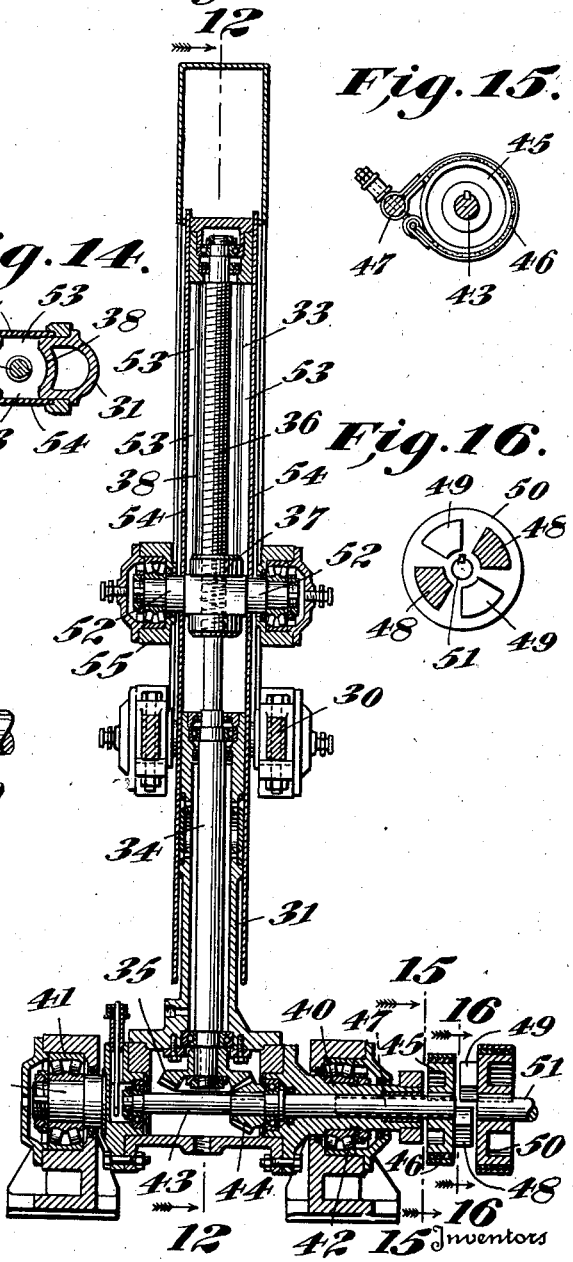
Inventors
Richard H. Stevens
and Tom Wilson.
By R. S. A. Dougherty,
Attorney Inventors
Richard H. Stevens
and Tom Wilson.
By R. S. C. Dougherty
Attorney

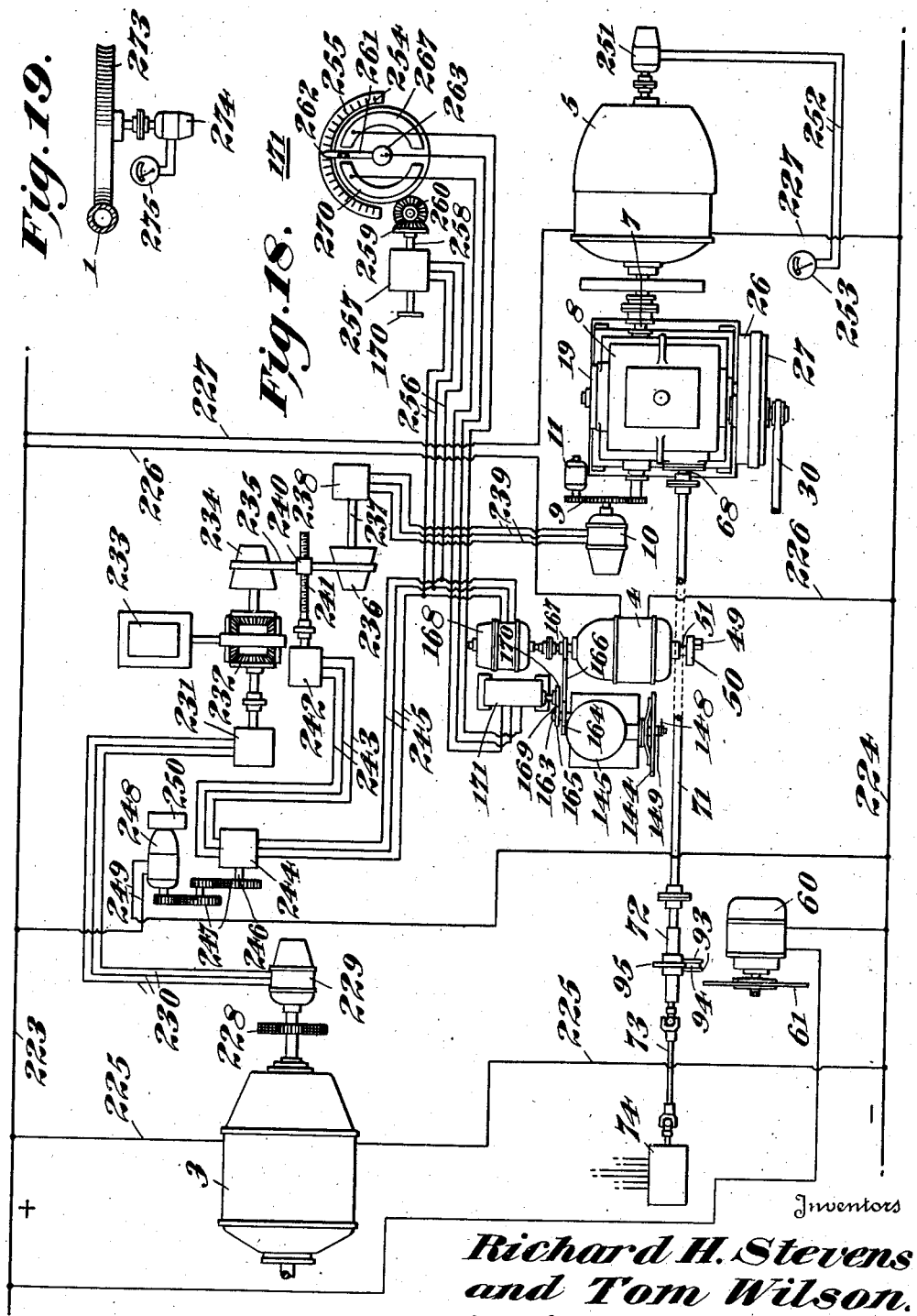

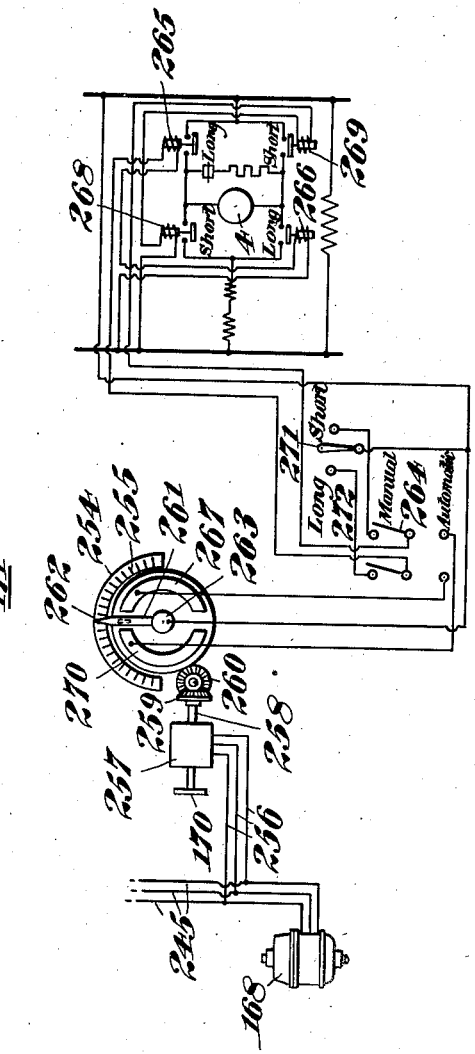

Feb. 25, 1947.  R. H. STEVENS ET AL  2,416,653
FLYING HOT SAW
Filed Nov. 13, 1942  14 Sheets-Sheet 13

Crank Angle.
Relative Horizontal Speeds.
$S = C(8.125 \sin a + 3 \times .375 \sin 3a)$ Inventors
Richard H. Stevens
and Tom Wilson.
By R. S. A. Dougherty.
Attorneys Feb. 25, 1947.  R. H. STEVENS ET AL  2,416,653
FLYING HOT SAW
Filed Nov. 13, 1942  14 Sheets-Sheet 14
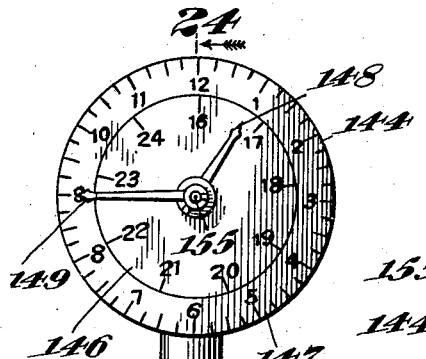
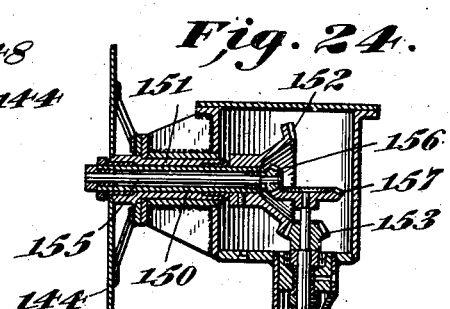
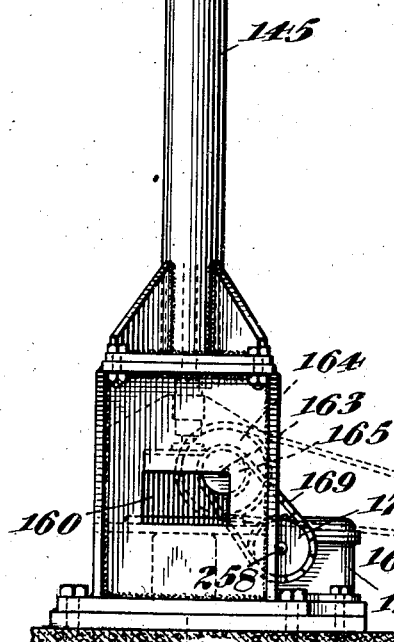
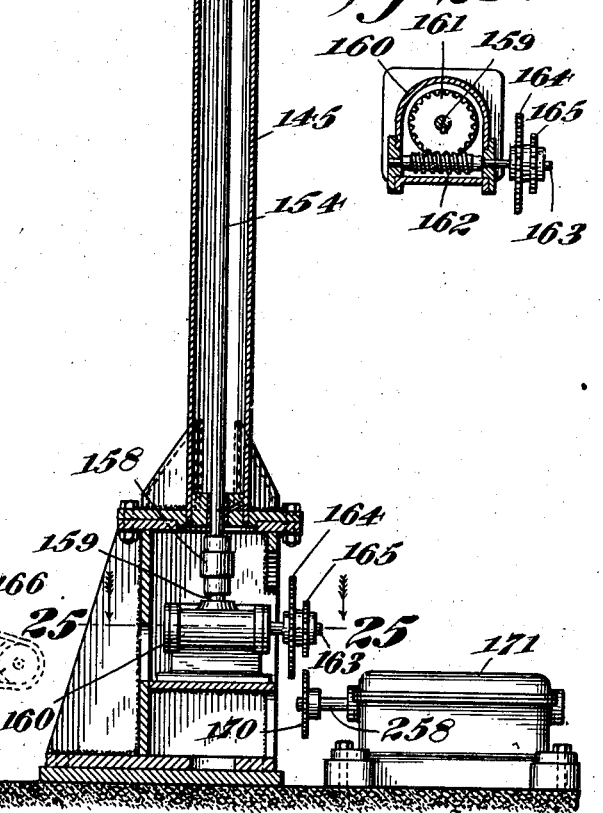
Inventors
Richard H. Stevens
and Tom Wilson.
By R. S. G. Dougherty,
Attorney Patented Feb. 25, 1947

2,416,653

UNITED STATES PATENT OFFICE 2,416,653

FLYING HOT SAW

Richard H. Stevens and Tom Wilson, Baltimore, Md., assignors to Bethlehem Steel Company, a corporation of Pennsylvania Application November 13, 1942, Serial No. 465,470

30 Claims. (Cl. 29—69)

This invention relates to apparatus for automatically severing rapidly moving objects such as pipes, rods and the like into predetermined lengths and is more especially designed for use with a continuous butt weld pipe mill. In pipe mills of this type the skelp when it comes from the rolling mill is in large coils. These coils are fed rapidly in succession to a machine which uncoils the skelp and straightens it and then it is advanced in a ribbon like form on a run out table or floor of the mill to form a long loop or a series of loops. The skelp is then passed through a furnace where it is heated to a welding temperature. As it issues from the heating furnace it is drawn through a bell or forming rolls, then between welding and sizing rolls, and while still hot and moving rapidly is cut by a flying saw into commercial lengths. The cut lengths are then passed between descaling rolls, and lastly transferred to a cooling bed. After a coil of skelp has been fed in this manner the next coil is placed in the machine for uncoiling. As this coil is fed to the run out table the crop ends of the rear end for the fed coil and the forward end of the coil to be fed are cut off and the two ends welded together. These operations are repeated and the skelp and pipe formed therefrom are advanced continuously at high speed.

In one well known and often used type of flying saw, a guide or trough supports the moving pipe in a fixed position with reference to the saw carriage, while the motor and saw are tilted laterally thereof on a reciprocating saw carriage to cut the pipe.

This type of saw in operation, however, has several disadvantages. If the pipe is traveling at a speed of 500 feet or more a minute as is the case in forming the smaller sized pipe and is being cut into 20 foot lengths, the saw must make a cut in less than every two and one half seconds. To trip the weight of the saw and motor at this high speed causes excessive wear on the carriage and to eliminate this condition the mill has to be slowed down, thus reducing the tonnage produced, or else an undue amount of valuable time and labor must be expected to be wasted in frequent shutdowns for repairs.

One of the objects of our invention relates to the mechanism for automatically swinging the pipe into cutting engagement with the saw during a reciprocating stroke of the saw carriage.

Another object of our invention relates generally to apparatus for cutting into predetermined lengths continuously moving pipe and particularly to means for synchronizing the movement of a pipe severing device with the moving pipe.

Another object of our invention relates to means which can be preset to indicate the travel of the pipe in feet and inches per minute.

Another object of our invention relates to mechanism which can be preset to automatically cut a plurality of pipe sections of uniform lengths.

Another object of our invention relates to mechanism by means of which pipe sections of different lengths can be automatically cut.

Another object of our invention relates to the means for adjusting the stroke of the saw carriage.

Another object of our invention is to provide a lost motion device between the rocking lever and the motor for adjusting its stroke.

With the foregoing and other objects in view, the invention will be more fully described hereinafter, and will be more particularly pointed out in the appended claims.

Referring now to the accompanying fourteen sheets of drawing which form a part of this specification and on which like characters of reference indicate like parts.

Fig. 9 is a plan view of the cam operating mechanism for actuating the trough to throw the pipe into or out of cutting engagement with the saw.

Fig. 10 is a vertical section through the saw carriage taken on the line 10—10 of Fig. 2.

Fig. 11 is a detail section taken on the line 11—11 of Fig. 5.

Fig. 12 is a vertical longitudinal section through the rocking lever taken on the line 12—12 of Fig. 13.

Fig. 13 is a vertical longitudinal section through the rocking lever taken on the line 13—13 of Fig. 12.

Fig. 14 is a transverse section through the rocking lever taken on the line 14—14 of Fig. 12.

Fig. 15 is a detail view of the constant drag brake taken on the line 15—15 of Fig. 13.

Fig. 16 is a detail view showing the jaws of a lost motion device taken on the line 16—16 of Fig. 13.

Fig. 18 is a diagram of the electrical control circuits for producing a uniform action saw carriage drive.

Fig. 19 is a detail view of a device which indicates the travel of the pipe in feet per minute.

Fig. 20 is a diagram illustrating an arrangement to preset the length of pipe to be cut.

Fig. 23 is a front elevation of the dial indicator device.

Fig. 24 is a vertical longitudinal section of the same taken on the line 24—24 of Fig. 23 and Fig. 25 is a detail section showing the driving gears for the dial indicator taken on the line 25—25 of Fig. 24.

Figure 1:
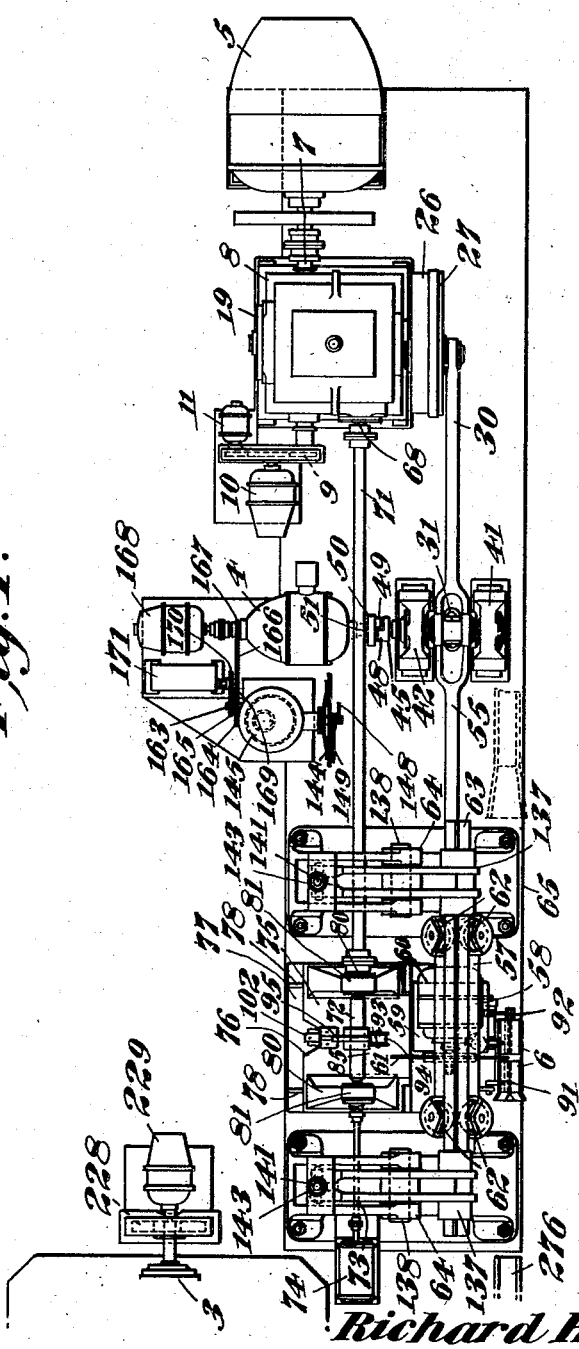
Figure 1 is a top plan view of a pipe severing device embodying our invention.
Figure 2:
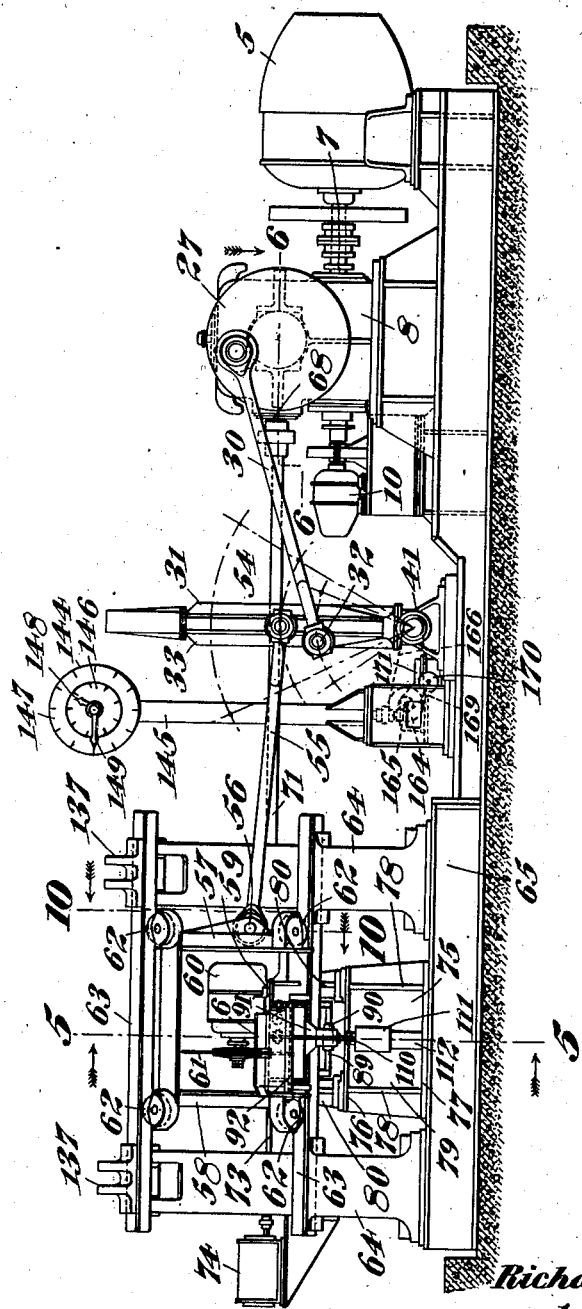
Fig. 2 is a front elevation thereof.
Figure 3:
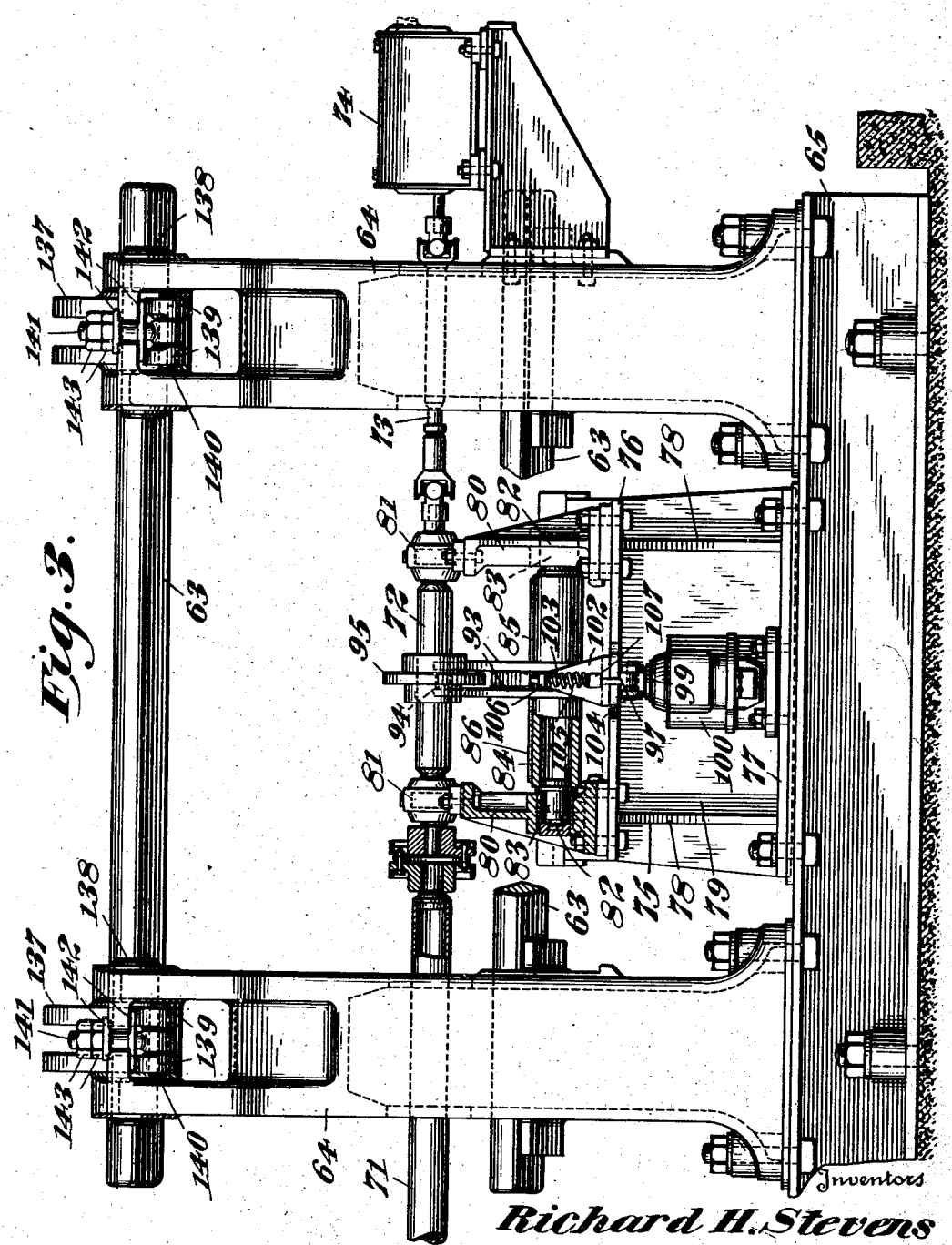
Fig. 3 is a rear elevation of the saw carriage supporting frame drawn on a larger scale with parts in section showing the arrangement of the cam operating device, for actuating the cam lever to throw the pipe into or out of cutting engagement with the saw.
Figure 4:
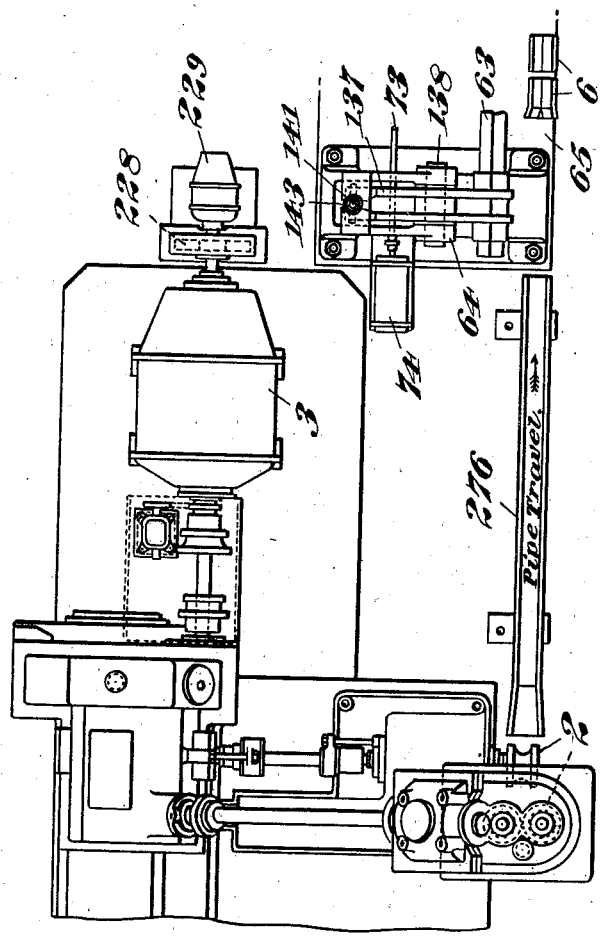
Fig. 4 is a detail in top plan showing the mill motor and the last sets of sizing rolls for advancing the pipe past the saw carriage.

Referring now to the various characters of reference on the drawings, the numeral 1, indicates the moving pipe to be cut, 2 the sizing rolls, 3 the mill motor for rotating the forming and sizing rolls to advance the pipe, 4 the motor for adjusting the block in the rocking lever and 5 the motor for reciprocating the saw carriage and the cam operating devices for actuating the movable trough 6, to throw the pipe 1 into cutting engagement with the saw.

The extending shaft of the motor 5 is coupled to a shaft 7 journaled in a gear casing 8 which extends beyond the same at its opposite end and is connected by a train of gearing 9 to a synchro-tie generator 10 and tachometer 11. The shaft 7 journaled in the gear casing 8 is provided with a worm 12 meshing with a worm wheel 13 which is keyed to a rotating tubular shaft 14 journaled in roller bearings 15 and 16 in the gear casing 8. A fixed shaft 17 extends through the tubular shaft 14 and is keyed at one end as at 18 to the cap 19 for the roller bearing 15 and supported near its opposite end in a roller bearing 20 and extends beyond the same and has a gear 21 keyed thereto meshing with a pinion 22 mounted for planetary movement around the gear 21 on a stub-shaft 23 journaled in roller bearings 24 and 25 of the casing for gear 21 and the pinion 22, which has its inner cup shaped portion 26, formed integral with the tubular shaft 14 and an outer cover portion 27 attached thereto.

The stub shaft 23 has an outwardly extending crank portion 28 which is eccentrically disposed in relation to the main body of the stub shaft and is provided with a roller bearing 29 thereon for pivoting one end of a connecting rod 30 that extends to the rocking lever 31 and pivoted thereto in a relatively fixed position by a bolt or shaft 32. This rocking lever 31 has a hollow outer casing 33 in which is journaled a spindle 34 having a beveled gear 35 secured to its lower end and its upper portion threaded as at 36 for engaging an adjustable block 37 mounted in a slideway 38. The lower end of the rocking lever is provided with trunnion projections 39 and 40 journaled in bearings 41 and 42. Journaled in the lower end of the rocking lever 31 is a shaft 43 having a beveled pinion 44 secured thereto for meshing with the beveled gear 35 on the lower end of the spindle 34. The shaft 43 extends through the central portion of the trunnion 40 and has a brake disk 45 for a brake band 46 which is connected to the journal bearing 42 by means of a pin 47 and is adaped to produce a constant drag on the brake disk 45. The brake disk 45 is also provided with a pair of jaws 48 for engaging a similar pair of jaws 49 extending from a brake disk 50 for a friction brake secured to the shaft 51 of the motor 4. The jaws 48 and 49 are spaced far enough apart to allow the rocking lever 31 to swing its maximum stroke and form a lost motion device during the normal reciprocation of the saw carriage 57.

When it is desired to adjust the stroke of the saw carriage 57 the motor will rotate the brake disks 50 and 45 and shaft 43 thereby rotating beveled pinion 44, beveled gear 35 and spindle 34 to raise or lower the adjustable block 37 depending upon which way the shaft 51 of the motor 4 is rotating.

The adjustable block 37 has trunnions 52 extending from its opposite sides that project through vertically extending openings 53 in the adjacent sides of the casing 33 of the rocking lever 31 which are closed by sliding cover plates 54. The trunnions 52 are pivoted in journal bearings in a bifurcated end of a pitman rod 55 that has its other end pivoted as at 56 to the frame of the reciprocating saw carriage 57.

The saw carriage 57 comprises a rectangular frame 58 provided with a table 59 for supporting a motor 60 for rotating a saw 61. The rectangular frame 58 has top and bottom members of inverted V-shape each having a pair of rollers 62 journaled thereon at their opposite ends, each pair of the rollers being disposed at an angle of 45° to each other and mounted to reciprocate the carriage on track bars 63 which are square in cross section and supported by the stationary end frames 64 mounted on a base 65.

In order to actuate the limit switch that controls circuits for the sequence operation, which will determine the number of reciprocations of the saw carriage per cut, a beveled gear 66 is keyed to the intermediate portion of the tubular shaft 14 which meshes with a similar beveled gear 67 secured to a shaft 68 mounted in a pair of journal bearings 69 and 70 in the gear casing 8. The shaft 68 extends outwardly beyond the side wall of the gear casing and is coupled to a longitudinally extending shaft 71 which in turn is coupled to and rotates a cam shaft 72 and connecting shaft 73 extending to the limit switch 74.

In operation the saw carriage is adapted to reciprocate continuously with the saw motor and saw 61 mounted thereon to travel with the carriage but in fixed relation thereto while the trough 6 is adapted to swing the pipe 1 into cutting engagement with the saw for one or after a plurality of reciprocations of the carriage.

The operation of tilting the trough 6 with the pipe 1 into cutting engagement with the saw will be more clearly understood by referring to Figs. 3, 5, 9 and 11 of the drawings. On base 65 is mounted a frame member 75 having a top wall 76, bottom wall 77 and end walls 78 connected by a web plate 79. Pedestal supports 80 are mounted on the top wall 76 at opposite ends of the frame member provided with journal bearings 81 and 82 for supporting the cam shaft 72 and the pivoted ends 83 of the tubular support 84 for a cam lever 85. The cam lever 85 has a flat plate portion 86 provided at its outer end with a rib 87 and a seat 88 for a cam 89 adapted to engage a cam roller 90 journaled in the lower end of a pivoted swinging arm 91 which has a bracket 92 at its upper end for supporting the movable trough 6 for receiving the pipe 1. A pair of spaced lever arms 93 are secured centrally to the tubular support 84 for the cam lever provided with a cam roller 94 at their upper ends for engaging a cam 95 mounted on the cam shaft 72, and at their lower ends which extend below the tubular support 84 with a pawl 96 for engaging a latch 97 which is pivoted as at 98 to the magnet 99 of a solenoid 100 mounted on the bottom wall 77 of the frame member 75. The latch 97 is pivoted at an intermediate point as at 101 to an ear extending from the under side of the top wall 76 of the frame member, and a bracket 102 is mounted above the same on the top of the wall 76 for supporting the upper end of an eye bolt 103 having its lower end pivoted as at 104 to the outer end of the latch 97 which is normally projected downwardly by means of a spring 105 which surrounds the eye bolt between the upper flanged portion 106 of the bracket 102 and a nut 107 on the eye bolt.

Figure 5:
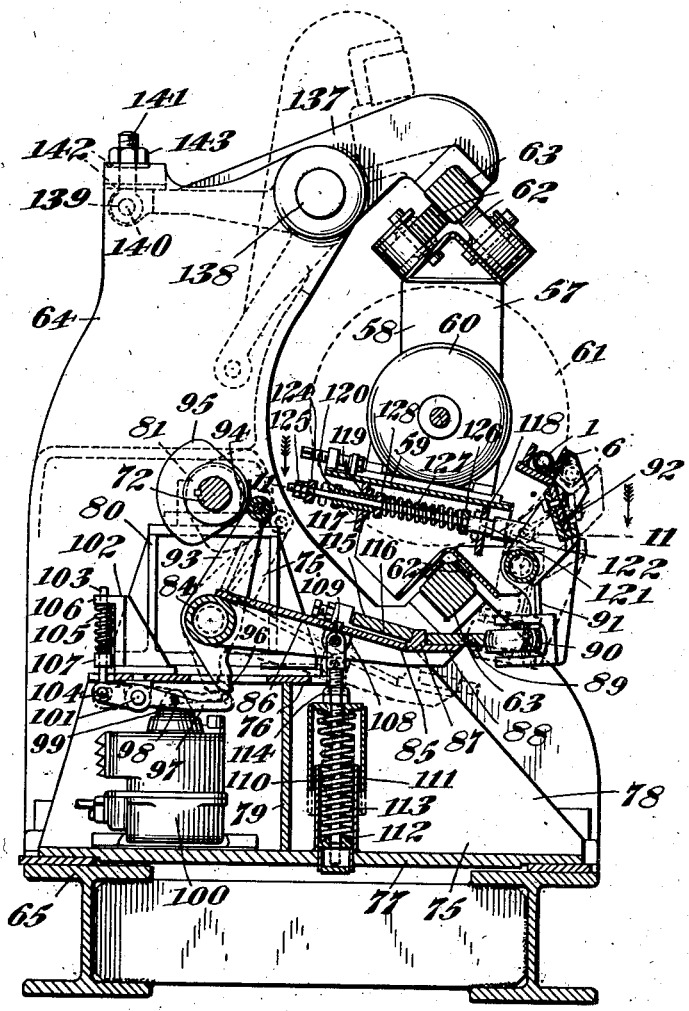
Fig. 5 is a vertical transverse section through the saw carriage and frame taken on the line 5—5 of Fig 2.

As illustrated in Fig. 5 the parts are indicated in full lines in the position they would assume for the cutting operation and in dotted lines the position they would assume normally when the solenoid 100 is deenergized. Normally when the solenoid 100 is deenergized the pawl 96 will engage the latch 97 and cam lever 85 and the parts movable therewith will be held as indicated in the dotted line position.

When it is desired to cut the moving pipe during a reciprocation of the carriage the solenoid 100 is energized thereby disengaging the latch 97 from the pawl 96. The cam lever 85 then has to be raised to bring the cam 89 into alignment with the cam roller 90. To accomplish this an ear 108 is secured to the under side of the intermediate portion of the flat plate 86 of the cam lever and is pivoted as at 109 to the clevised upper end of a bolt 110 with its lower end extending into cylindrical casings 111 and 112 and having a compression spring 113 thereon. The lower casing 112 is fixed and welded to the bottom wall 77 of the frame member 75, while the upper casing 111 is slidable thereon and is normally limited in its upward movement by nuts 114 threaded on the bolt 110. In order to limit the upward movement of the cam lever 85 a stop plate 115 is provided having its ends supported in brackets 116 extending upwardly from the end walls 78 of the frame member 75. It is also necessary to return the pivoted swinging arm 91 and trough 6 to their normal position. To accomplish this the table 59 of the saw carriage is provided with a pair of spaced downwardly extending plates 117 and 118. The plate 117 is provided with a pair of spaced perforations 119, the plate 117 being reinforced around said perforations and each threaded to receive a threaded bushing 120. The plate 118 has perforations 121 in alignment with the perforations 119 for receiving rods 122, each having a clevised end pivotally connected as at 123 to the swinging arm 91. The rods 122 extend through the perforations 121 and through the bushings 120 and are connected together at their inner ends by means of a crosshead 124 that is held in position by nuts 125. The rods 122 each have a shoulder for engaging a washer 126 that contacts one end of a compression spring 127 while the opposite end of that spring engages a washer 128 at one end of the bushing 120. Disposed centrally between rods 122 and extending through the plates 117 and 118 is a buffer which is engaged on the return movement of the swinging arm 91 comprising a tubular casing 129 for holding a compression spring 130 having a plug 131 with a perforation 132 secured to one end and a cap 133 at the opposite end for retaining a plunger 134 which is projected forward by the spring 130. The extending end of this plunger is adapted to engage an adjustable set screw 135 which is threaded into the central portion of the cross-head 124 and held in set position by means of a nut 136.

As it is sometimes desirable to mount or remove the reciprocating saw carriage 57 and the parts mounted thereon as a unit, the stationary end frames 64 are each provided with a hinged top portion 137 for supporting the top track bar 63 and is pivoted on a shaft 138 to the main end frame 64. The opposite end of each of the portions to that supporting the track bar is bifurcated and perforated as at 139 to which is pivoted as at 140 an eye bolt 141 having its shank extending through a slot in the stationary end frame 64 with washers 142 and nuts 143 mounted thereon for clamping the end in a fixed position. When the nuts 143 are unscrewed the hinged portions 137 can be swung into the position indicated in dotted lines in Fig. 5.

In Figs. 1, 2, 23 and 24 we have shown means for indicating the length of pipe cut in which 144 is a dial mounted on a pedestal support 145 having indicating scales graduated in feet as at 146 and inches as at 147 and provided with pointer hands 148 and 149 therefor respectively. The shorter hand 148 pointing to feet is secured to the outer end of a tubular horizontally extending shaft 150 supported in a journal bearing 151 extending from the top portion of the pedestal support 145 and has a beveled gear 152 mounted on its opposite end which meshes with a beveled miter gear 153 which is secured to a vertically extending shaft 154 near the top portion. The longer hand 149 is secured to the outer end of a small shaft 155 mounted in the tubular shaft 150 and has a beveled miter gear 156 secured to its opposite end meshing with a beveled gear 157 attached to the upper end of the shaft 154. The vertically extending shaft 154 is journaled in the pedestal support 145 and is coupled at its lower end as at 158 to a stub-shaft 159 journaled in a housing 160 and having a worm wheel 161 mounted thereon meshing with a worm 162 supported in the housing 160 and having a shaft 163 extending outwardly therefrom upon which is mounted sprocket wheels 164 and 165. The sprocket wheel 164 is connected by means of a sprocket chain 166 to a sprocket wheel 167 on the shaft of motor 4 which extends to a synchro-tie generator 168, and the sprocket wheel 165 is connected by means of a sprocket chain 169 to a sprocket wheel 170, on the shaft for a limit switch 171.

Figure 6:
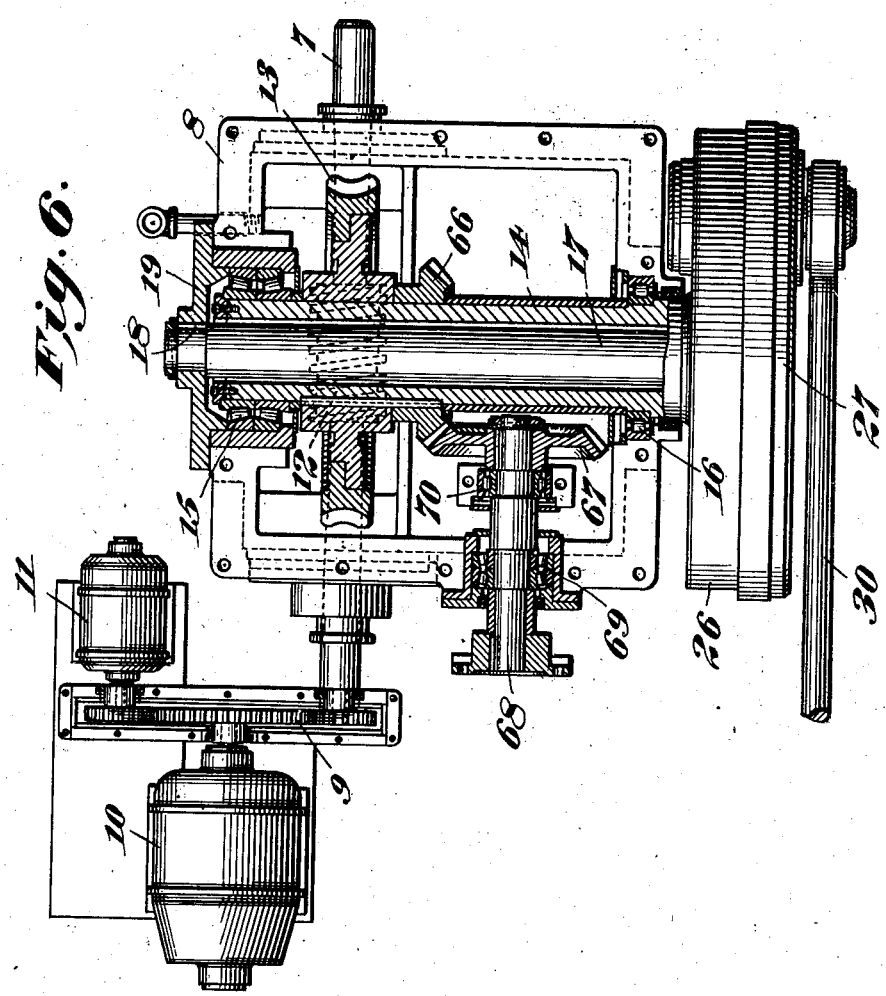
Fig. 6 is a detail of the carriage drive mechanism with parts in section taken substantially on the line 6—6 of Fig. 2 to show more clearly the construction.
Figure 7:
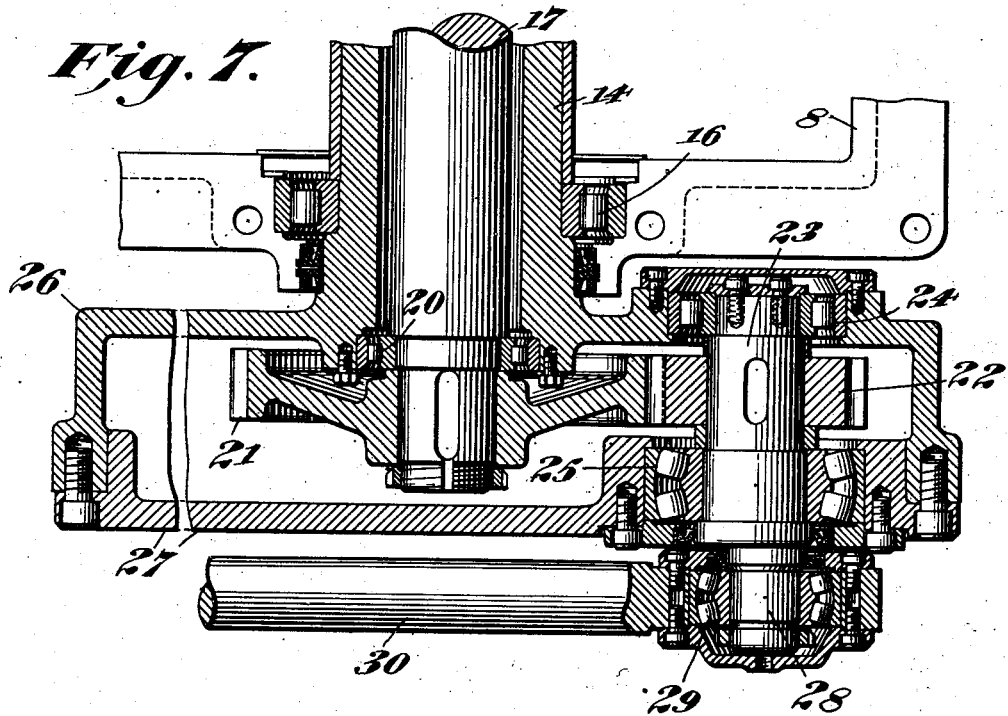
Fig. 7 is a detail view in section also taken on the line 6—6 of Fig. 2 showing the connection between the cut timing gears and the connecting rod which extends and is pivoted to the rocking lever.
Figure 8:
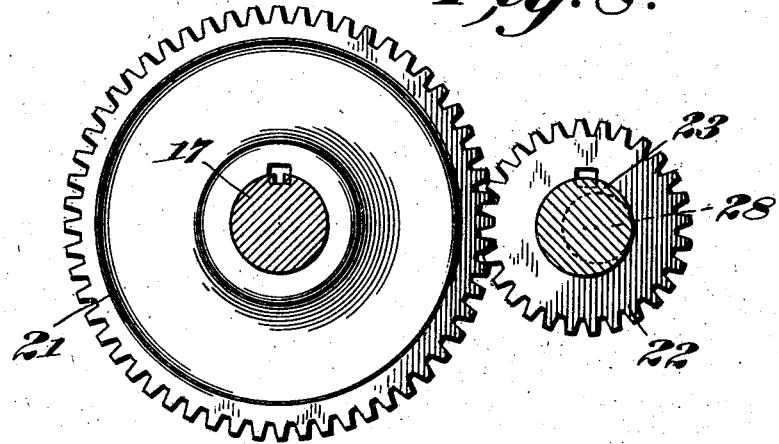
Fig. 8 is a detail of the planetary gears for controlling the saw cuts.
Figure 21:
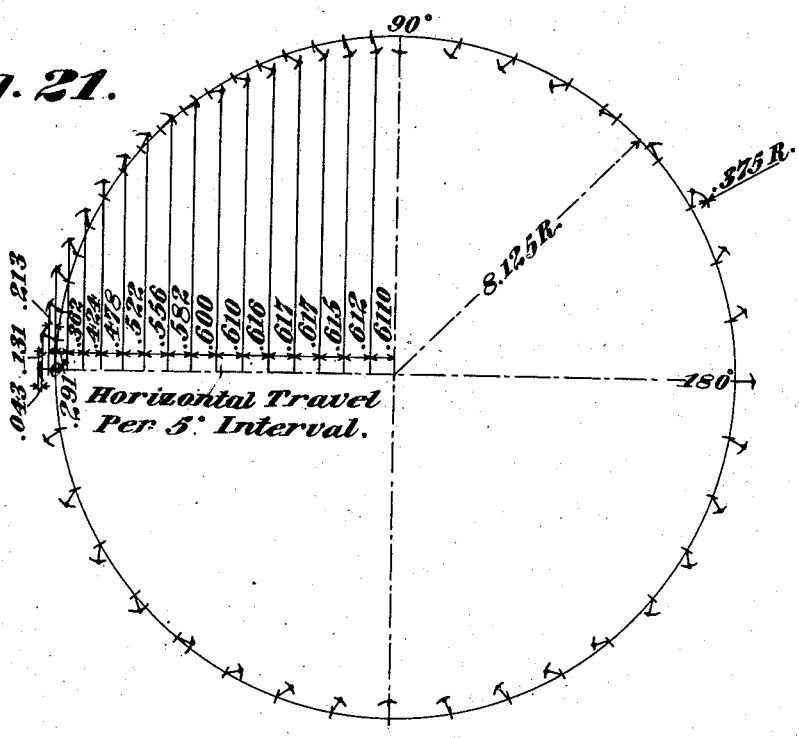
Fig. 21 is a diagram showing the circular path of the stub shaft for the planetary moving pinion and the horizontal movement in per 5° intervals of the crank or eccentrically disposed portion.
Figure 22:
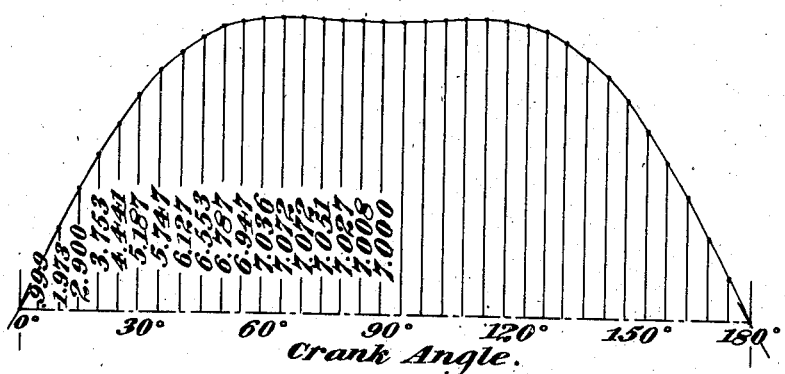
Fig. 22 is a diagram showing the relative horizontal speeds of the crank or eccentrically disposed portion of the stub shaft during the reciprocation of the saw carriage.

The speed of the driving means is controlled to suit the speed of the pipe 1, through synchro-tie generators and motors. As the speed and stroke of the saw carriage 57 will vary with the adjustment of the pivotal end of the pitman rod 55 on the rocking lever 31, and the connecting rod 30 having a relatively fixed pivotal connection at 32 in relation to the rocking arm 31 it is necessary to compensate for the variation during the cutting operation by having the opposite end of rod 30 pivoted on the eccentrically disposed portion 28 of the stub-shaft 23. As indicated in Figs. 6 and 7 the pinion 22 on the stub-shaft 23 revolves in a circular path around the fixed gear 21 in a planetary manner with the crank or eccentrically disposed portion of said stub-shaft traveling in an eccentric path as indicated in the diagram shown in Fig. 21. This will give a relative horizontal uniform speed to the saw carriage 57 and saw 61 during the cutting operation as indicated in the central portion of the diagram shown in Fig. 22.

Figure 17:
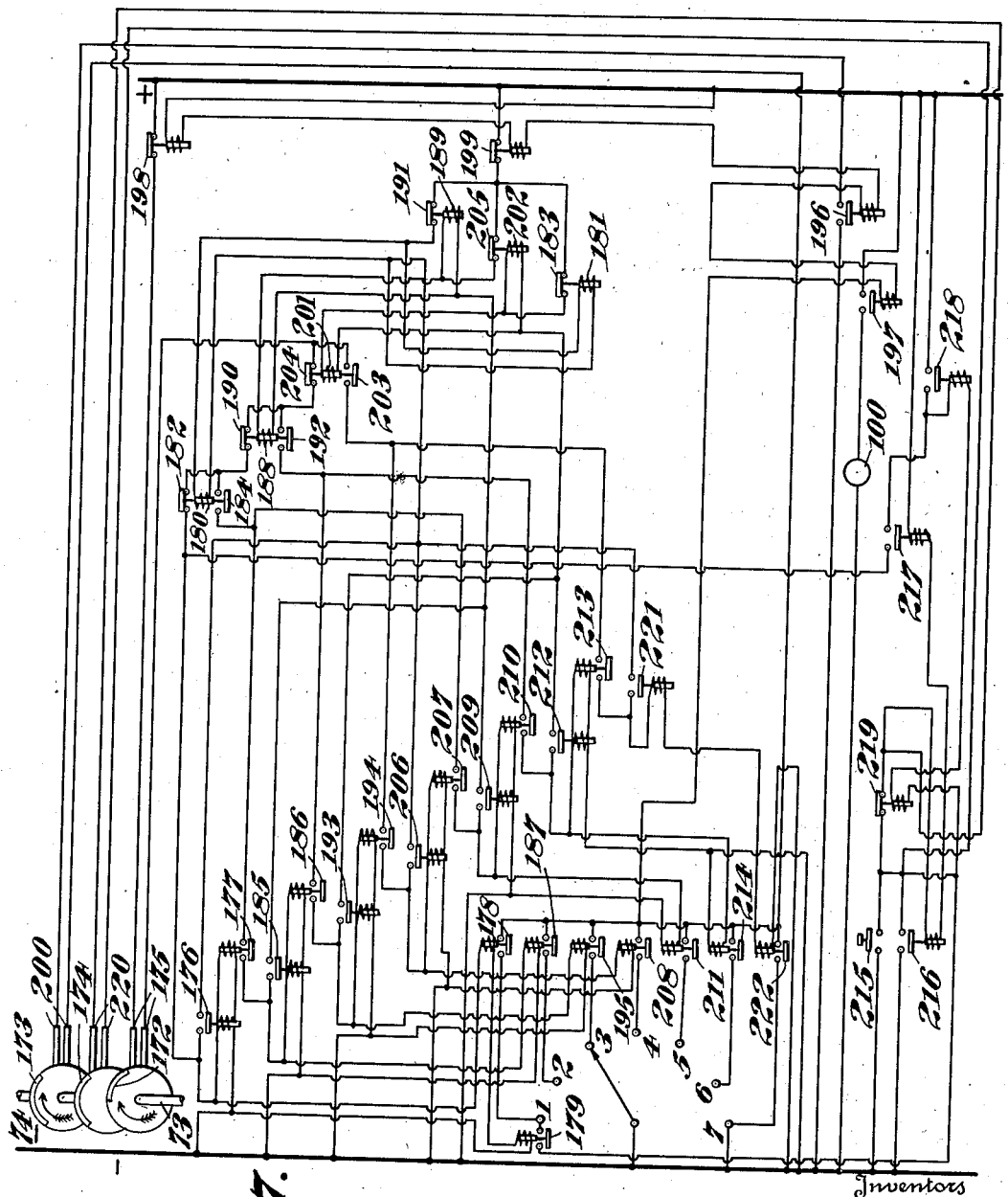
Fig. 17 is a diagram of the electrical control circuits for the sequence operation which will determine the number of reciprocations of the saw carriage per cut of pipe section.

The pinion 22 revolves once around the fixed gear 21 for each reciprocation of the saw carriage 57, at the same time the gearing in the gear casing 8 rotates shafts 71, 72 and 73 thereby rotating the control segments 172, 173 and 174 of the limit switch 74 one revolution for each reciprocation of the saw carriage 57 and the control for the sequence operation which will determine the number of revolutions of the pinion 22 per cut is indicated in Fig. 17. This diagram shows an arrangement that will accommodate any spacing from one revolution to seven revolutions of the pinion 22 and control segments per cut, and assuming that the contact arm for the cut selector is set on No. 3 position and the coils for the relays are deenergized and in the position as indicated in the diagram, when control segment 172 makes contact with the fingers 175 it closes relays 176, 177, 178 and 179. A holding circuit is established through coils 180 and 181, but current does not flow through the same until 172 breaks contact, at which time coils 180 and 181 are energized, opening contacts 182 and 183 and closing 184.

When control segment 172 makes contact with the contact fingers 175 on the second revolution, relays 185, 186 and 187 are closed with a holding circuit established through coils 188 and 189, but current does not flow until control segment 172 breaks contact at which time 188 and 189 are energized thereby opening contacts 190 and 191 and closing contact 192. Coils 180 and 181 are deenergized, closing contacts 182 and 183 and opening contacts 184, 176, 177, 178 and 179. The functioning of segments 173 and 174 has no effect on this sequence.

When control segment 172 makes contact with the contact fingers 175 for the third revolution, relays 193, 194 and 195 are closed thereby immediately closing relays 196 and 197 for controlling the solenoid 100 and opening relays 198 and 199. Relays 196 and 197 remain closed due to the interlocking action of the control segment 173 which engages the contact fingers 200 of the holding circuit. This closing of relays 196 and 197 opens relays 185, 186, 187, 193, 194 and 195, thus resetting the control relays. Control segment 173 then breaks contact to open relays 196 and 197 and closes relays 198 and 199 after the cut is made.

Assuming that the cut selector had been set for No. 6, when control segment 172 makes contact with the fingers 175 on the third revolution relays 193, 194, and 195 are closed and establishes its holding circuit through coils 201 and 202. When contact segments 172 breaks contact 203 closes and 204 and 205 are opened, and the holding circuit for 185, 186, 187, 188 and 189 is opened.

On the fourth revolution when control segment 172 makes contact with the fingers it closes relays 206, 207 and 208. One side of the circuit is made through contacts 203 and 194 and through 206, 207 and 208 coils to — bus bar line, and the holding circuit from the + bus bar line through relay contacts 199 and 191, coils 180 and 181, contactor 206, coils 206, 207 and 208 to the —, bus bar line. When coils 180 and 181 are energized contact 203 is opened through the interruption of the holding circuit for 193, 194 and 195.

On the fifth revolution when the control segment 172 makes contact with the fingers, it closes relays 209, 210 and 211. One side of the circuit is made through contacts 204, 190, 184, 207, coils 209, 210 and 211 to — bus bar line, and the holding circuit through contacts 199, 205, coils 188, 189 contact 209 and coils for 209, 210, and 211 to — bus bar line. When the coils 188 and 189 are energized contacts 190 and 191 are opened and contact 192 is closed and interrupts the holding circuit for 206, 207 and 208.

On the sixth revolution when the contact segment 172 makes contact with the fingers it closes relays 212, 213 and 214 and immediately closes relays 196 and 197 which control the saw solenoid 100 and opens contacts of 198 and 199 relays.

Relays 196 and 197 remain closed through the interlocking action of the holding circuit and contact segment 173. The opening of relays 198 and 199 opens relays 209, 210, 211, 212, 213 and 214, thus resetting the control relays, and when contact segment 173 breaks contact it opens relays 196 and 197 and allows 198 and 199 to close. After the cut is made all the relays will be deenergized and will be in the position indicated in Fig. 17, and the desired sequence can be repeated.

If a test piece is desired, the push button 215 is pressed and relays 216 and 217 will be closed and stay closed through the action of the holding circuit as established by relay 216. If this occurs during the first revolution of a sequence when relays 176, 177, 178 and 179 are closed, relays 196 and 197 will be closed by a circuit established from the — bus bar line through contacts 216, 179 and 178 coils 197, 196, 199 and 198 to the + bus bar line. This will actuate the saw cut solenoid 100 as described previously.

At the same time that this is occurring the interlocking and disconnecting circuit for the test piece circuit is functioning. After the closing of 216 and the resulting closing and interlocking of 216 and 217 and when contact segment 172 engages the contact fingers 175 a circuit will be established from the + bus bar line through segment 172, contacts 204, 190, 182, 217, coils of 218 and 219, and contact 216 to — bus bar line. This will open 219 and close 218. At the same instant 172 closes the contact segment 174 will engage the fingers 220 and close a circuit shorting contact 219. As a result the holding circuit of 216 and 217 will be maintained until switch 174 is opened. At this same time coil 218 establishes a holding circuit for itself and 219 through its own contact.

When contacts 196 and 197 are closed contacts 198 and 199 will be opened deenergizing coils 178 and 179. However, contacts 198, 199, 196 and 197 will be interlocked by contact segment 173 until after contact segment 172 is opened and the test piece cut. When contact segments 173 and 174 are opened contacts 196 and 197 will open and the short around 219 will be withdrawn, allowing 219 to break the interlocking circuit 216 and 217. When 216 opens the interlocking circuit of 218 and 219 will be broken and 219 will close and 218 will open, thus restoring the test piece circuit to normal.

In case push button 215 is closed after the first revolution, the sequence will continue to completion, and on the next revolution when contact segment 172 engages the contact fingers 175, a test piece will be cut as previously described.

Relays 221 and 222 are also provided for a seventh revolution per cut.

With this manner of control after the saw has made its cut all the coils for the relays will be deenergized and the desired sequence can then be repeated.

Referring now to Fig. 18 which is a view showing diagrammatically the electrical circuits for controlling the operation of the drive for the flying saw, the positive and negative bus bars are indicated by the numerals 223 and 224 respectively, 3 the mill motor, 4 the motor for adjusting the stroke of the swinging lever, and 5 the motor for reciprocating the saw carriage 57, each of which is provided with a circuit 225, 226 and 227, respectively, extending to the bus bars 223 and 224. The mill motor 3 is connected by means of gearing 228 or the like to a synchro-tie generator 229 which is adapted to drive through the circuit connection 230 a synchro-tie motor 231 which has a shaft for actuating a mechanical differential 232 provided with a regulator 233 to adjust the speed of the driving motor 5 and a cone pulley 234 which is connected by means of a belt 235 to the cone pulley 236, having a shaft 237 rotated by means of a synchro-tie motor 238 having a circuit connection 239 extending to the synchro-tie generator 10 for the motor 5. For adjusting the speed of the driving motor 5 to compensate for various saw radii the belt 235 connecting the cone pulleys 234 and 236 is provided with a threaded belt shift 240 which is adjusted by means of a threaded rod 241 adapted to be rotated by means of a synchro-tie motor 242, having a circuit 243 extending to a synchro-tie motor 244. These two synchro-tie motors 242 and 244 receive their power from the synchro-tie generator 168 driven by the motor 4 for adjusting the stroke of the rocking lever 31, through the circuit 245.

In order to provide for vernier adjustment of the pulleys 234 and 236 and the saw stroke, the synchro-tie motor 244 has a shaft 246 connected by means of a train of gearing 247 with the shaft of the motor 248 having a circuit connection 249 extending to the bus bars 223 and 224. Said motor 248 is also provided with a brake 250 for controlling the same.

The motor 5 for reciprocating the saw carriage has its shaft provided at one end with a D. C. magneto generator 251 having a circuit connection 252 extending to a voltmeter 253 calibrated for indicating the gear motor speed.

The opposite end of the shaft for the driving motor 5 is connected to reduction gearing in the gear casing 8 as shown in Fig. 6 of the drawings. The shaft of motor 5 is also connected by a train of gearing 9 to a synchro-tie generator 10 and a tachometer 11 which may be used in addition to the meter 253 for indicating the speed of the driving motor 5 at this point.

Mounted on a bracket secured to one end of the saw carriage frame 64 is the limit switch 74 having the control segments 172, 173 and 174 and contact fingers 175, 200 and 220 mounted therein for the saw cut control circuits.

The motor 4 for adjusting the stroke of the rocking lever 31 and synchro-tie generator 168 have their shafts coupled together with a sprocket wheel 167 mounted on the shaft of the motor 4 connected by means of a sprocket chain 166 to a sprocket wheel 164 on the shaft 163 for the worm 162 for actuating the hands on the dial 144 to indicate the length of pipe being cut. The worm shaft 163 is also provided with a sprocket wheel 165 which is connected by means of a sprocket chain 169 to a sprocket wheel 170 for actuating a limit switch 171 for controlling a dial indicator, the operation of which will be more clearly understood by referring to the diagram shown in Fig. 20. In this diagram illustrated in Fig. 20 there is shown the indicating dial 254 with an arrangement to preset the length of pipe to be cut. This dial has a scale 255 which reads in inches corresponding to the length of the travel of the pivotal point upon the rocking lever 31 which controls the stroke of the saw carriage. This dial is driven through a synchro-tie connection to the rocking lever stroke adjusting motor 4 comprising chain and sprocket connections, synchro-tie generator 168, circuit connection 256, synchro-tie motor 257 and shaft 258 provided with a beveled gear 259 meshing with a beveled gear 260 which engages the periphery of the dial 254.

Pivoted centrally on the dial 254 is a contact arm 261 having a pointer 262, which can be moved to any predetermined value desired upon the scale 255, depending upon the length of pipe to be cut, by means of an adjusting knob 263. With this device the operator while rolling a schedule of pipe of a given length will determine the next length of pipe to be cut and will move the contact arm 261 to a value on the scale 255 that will correspond to the arc through which the rocking lever arm will travel. To illustrate this, assume that the operator by means of the adjusting knob 263 moves the contact arm 261 to the right, which would permit cutting a longer length of pipe than is being cut at the time this change is being made. Nothing will happen until the double throw switch 264 which is marked "manual" at the top and "automatic" at the bottom is thrown to the bottom. When this is done the left-hand blade of the switch 264 shown in Fig. 20 will be active and will close the circuit to the operating coils 265 and 266 marked "long" in the diagram. The circuit will be from the left-hand bus bar through coils 265 and 266 marked "long" and then back to the revolving segment 267, contact arm 261, middle stud of knob 263 of dial 254 and then back to the opposite side of the control bus bar. This will start motor 4 in the direction to increase the length or radius of the rocking lever arm and by means of the synchro-tie equipment the dial 254 will rotate until its automatic position corresponds to the preset position of the contact arm 261 at which time the motor 4 will stop.

If the operator desires to cut a shorter length of pipe he moves the contact arm 261 to the left which will permit cutting a shorter length of pipe than is being cut at the time this change is being made. When the switch 264 is thrown into the "automatic" position, the right-hand blade of said switch will be active and will close the circuit to the operating coils 268 and 269 marked "short." The circuit will then be from the left-hand bus bar through coils 268 and 269 marked "short" and then back to the revolving segment 270, contact arm 261, middle stud or knob 263 of dial 254, and then back to the right-hand bus bar. This will start motor 4 in the reverse direction to that above described and will decrease the length or radius of the rocking lever and by means of the synchro-tie equipment, the dial 254 will rotate until its off position corresponds to the preset position of the contact arm 261 at which time the motor 4 will stop.

If for any reason it is desirable to inch the motor 4 to change the radius of the rocking lever arm, the switch 264 can be moved to the upper position marked "manual" after which the motor 4 can be moved in one direction or the other depending upon which way the vertical handle 271 of the master switch 272 is moved. It will be noted that on the left-hand side the master switch 272 is marked "long" and on the right-hand side "short." The switch 264 is a standard double-pole type of control switch and is adapted for the operator to hold it in position until the desired movement is completed and then return it to the off position.

If there is any over-travel the said two-pole switch 264 will cause the motor 4 to start in the reverse direction to come back to position.

In Fig. 19 is shown a device that will indicate the travel of the pipe in feet per minute, and a corresponding instrument that will be calibrated on a similar scale that is operated by a magneto generator on the motor 4 that rotates the rocking lever arm. This consists of a pinch roll 273 which contacts with the traveling pipe 1 which drives a D. C. magneto generator 274 to which is connected a voltmeter 275 calibrated in feet per minute. A similar instrument 253 is connected to the magneto generator 251 driven by the motor 5.

Having thus given the foregoing general and detailed description of our invention, we will now further describe the operation of the same.

Assuming that the cut selector is set on No. 3 position as indicated in Fig. 17 the pipe 1 after leaving the welding and sizing rolls 2 is advanced through the channel or stationary trough 276 into the movable trough 6 adjacent to the continuously reciprocating saw carriage 57 having a continuously rotating saw 61 mounted thereon. The saw carriage is provided with rollers 62 for engaging track bars 63 secured to the stationary end frames 64 for guiding and supporting the same.

The saw carriage 57 is reciprocated by means of a motor 5 through shaft 7, worm 12 and worm wheel 13 which is keyed to a rotating tubular shaft 14 journaled in bearings in the gear casing 8. The tubular shaft 14 has an enlarged extending cup shaped portion 26 with a cover 27 in which is journaled the stub shaft 23 having a pinion 22 mounted thereon adapted to revolve in a concentric planetary path around a fixed gear 21. The stub shaft 23 has a crank arm 28 or eccentrically disposed extending portion for pivoting one end of a connecting rod 30 having its opposite end pivoted in a relatively fixed position to the rocking lever arm 31. This rocking lever arm 31 has an adjustable block 37 mounted therein with a pitman 55 having one end pivoted thereto for adjustment and its opposite end pivoted to the reciprocating saw carriage in a relatively fixed position.

Keyed to the tubular shaft 14 in the gear casing 8 is a beveled gear 66 meshing with a similar beveled gear 67 on shaft 68 connected by couplings to the longitudinally extending shaft 71, cam shaft 72, and a shaft 73 extending to the limit switch 74 having the segment contacts 172, 173 and 174 mounted therein for controlling the saw cut.

As the cut selector is set on No. 3, during the first two reciprocations of the saw carriage 57 the parts will remain in the position indicated in dotted lines in Fig. 5. On the third reciprocation of the saw carriage 57 the limit switch 74 will close the circuit to energize the solenoid 100 thereby disengaging the latch 97 from the pawl 96 allowing the spring 113 to raise the cam lever 85 until it engages the stop 115. This will bring the cam 89 into the path of the cam roller 90 to swing the pivoted arm 91 and movable trough 6 and pipe 1 into the full line position to cut the pipe as indicated in Fig. 5. After the pipe 1 has been cut and the solenoid 100 deenergized, the cam 95 engaging the cam roller 94 will again return the cam lever 85 to the dotted line position and the spring 105 will actuate the latch 97 to engage the pawl 96 to hold the parts in this position until the solenoid is again energized to repeat the operation.

The spring 127 will also return the pivoted swinging arm 91 and movable trough 6 to the dotted line position.

Although we have shown and described our invention in considerable detail, we do not wish to be limited to the exact construction shown and described, but may use such substitutions, modifications or equivalents thereof, as are embraced within the scope of our invention, or as pointed out in the claims.

Having thus described our invention, what we claim as new and desire to secure by Letters Patent is:

1. A machine for severing continuously moving pipe or the like into lengths, comprising a stationary frame, spaced track bars secured thereto, a carriage mounted to reciprocate between the track bars, means for reciprocating the carriage, a continuously rotating saw mounted on the carriage, a guide for supporting the moving pipe attached to a swinging arm pivotally mounted on the carriage, a cam roller on the swinging arm, a cam lever journaled at one end in a stationary frame member adjacent to the carriage, a cam secured to the opposite end of the cam lever, a pawl extending from the cam lever, a resiliently actuated latch for engaging the pawl for normally holding the cam out of the path of the cam roller during the reciprocation of the carriage, electromagnetically controlled means for releasing the latch, resilient means for swinging the cam into the path of the cam roller for tilting the guide to project the pipe into cutting engagement with the saw during a reciprocation of the carriage, a stop for limiting the swinging movement of the cam lever, cam actuated means for returning the cam lever to its normal position, and resilient means for returning the guide to its initial position after the cutting operation.

2. A machine for severing continuously moving pipe or the like into lengths, comprising a pair of stationary end frames each having a hinged top portion pivoted thereto, a track bar connecting the stationary end frames, an upper track bar connecting the hinged top portions of the stationary end frames, a carriage mounted to reciprocate between the track bars, a pair of rollers rotatably mounted at the top and bottom of each end of the carriage for engaging the top and bottom track bars, means for reciprocating the carriage, cutting means mounted on the carriage, a guide pivotally connected to the carriage for supporting the moving pipe, means for tilting the guide to project the pipe into engagement with the cutting means during a reciprocation of the carriage, clamping means for normally retaining the hinged top portions of the stationary end frames in position, and means for swinging the hinged top portions of the end frames and top track bar to allow mounting or removal of the carriage as a unit.

3. A machine for severing continuously moving pipe or the like into lengths, comprising a pair of stationary end frames each having a hinged top portion pivoted centrally thereto, a lower track bar connecting the stationary end frames, an upper track bar connecting the hinged top portions of the stationary end frames, a carriage mounted to reciprocate between the track bars, a pair of rollers rotatably mounted at the top and bottom at each end of the carriage for engaging the top and bottom track bars, a continuously rotating saw mounted on the carriage, a guide pivotally connected to the carriage for supporting the moving pipe, means for tilting the guide to project the pipe into cutting engagement with the saw during a reciprocation of the carriage, a pivoted clamping bolt for normally retaining each of the hinged top portions of the stationary end frames in position, and means for swinging the hinged top portions of the end frames and top track bar to allow mounting or removal of the carriage as a unit.

4. A machine for severing continuously moving pipe or the like into lengths, comprising a stationary frame, track bars secured thereto, a carriage mounted to reciprocate on the track bars, means for reciprocating the carriage, a continuously rotating saw mounted on the carriage, a swinging arm pivoted centrally to the carriage, a guide for the moving pipe attached to the upper end of the swinging arm, a cam roller mounted in the lower end of the swinging arm, a cam lever journaled at one end in a stationary frame member adjacent to the carriage, a cam attached to the movable end of the cam lever for engaging the cam roller, means for normally holding the cam out of engagement with the cam roller during the reciprocation of the carriage, preset means electromagnetically controlled for moving the cam into the path of the cam roller to tilt the guide and project the pipe into cutting engagement with the saw during a reciprocation of the carriage, and cam actuated means for returning the cam lever to its normal position.

5. A machine for severing continuously moving pipe or the like into lengths, comprising a stationary frame, track bars secured thereto, a carriage mounted to reciprocate on the track bars, means for reciprocating the carriage, a continuously rotating saw mounted on the carriage, a swinging arm pivotally attached to the carriage, a guide mounted on the swinging arm for supporting the pipe, a cam roller carried by the swinging arm, a movable cam for engaging the cam roller to tilt the guide to project the pipe into cutting engagement with the saw during the reciprocation of the carriage, independent means for raising and lowering the movable cam, a latch for normally holding the movable cam out of engagement with the cam roller, and resilient means for returning the guide to its normal position after the cutting operation.

6. A machine for severing a continuously moving pipe or the like into lengths, comprising a stationary frame, a carriage mounted to reciprocate continuously in the stationary frame, actuating means for reciprocating the carriage, means for adjusting the stroke of the carriage, a continuously rotating saw mounted on the carriage, a guide pivotally attached to the carriage for supporting the moving pipe, means for normally retaining the moving pipe out of cutting engagement with the continuously rotating saw during each reciprocation of the carriage, preset means electrically controlled by the actuating means for the carriage for tilting the guide laterally to project the pipe into cutting engagement with the saw during a reciprocation of the carriage, and means for returning the guide to its initial position.

7. A machine for severing continuously moving pipe or the like into lengths, comprising a stationary frame, track bars secured thereto, a carriage mounted to reciprocate on the track bars, a continuously rotating saw mounted on the carriage, means for projecting the pipe into cutting engagement with the saw during a reciprocation of the carriage, a motor having a connection with the driving gearing for reciprocating the carriage, a rocking lever having trunnion extensions at its lower end journaled in bearings mounted between the driving gearing and the carriage, a screw-threaded rod journaled in the rocking lever having a beveled gear secured to its lower end, a block screwthreaded to engage the screw-threaded rod for adjustment, a connecting rod between the driving gearing and the rocking lever, a pitman rod connecting the carriage with the rocking lever, a pivotal connection between one end of the pitman rod and the adjustable block, a shaft journaled in the trunnion extensions having a beveled gear secured thereto meshing with the beveled gear on the lower end of the screw-threaded rod, a motor having a connection with the shaft journaled in the trunnion extensions for rotating the screw-threaded rod to adjust the block and change the stroke of the carriage, and a pair of friction disks having interlocking spaced jaws in the connection between the motor and the shaft journaled in the trunnion extensions to allow play of the rocking lever independent of the motor for adjustment.

8. A machine for severing continuously moving material into lengths comprising a stationary frame, track bars secured thereto, a carriage mounted to reciprocate on the track bars, means for reciprocating the carriage, means on the carriage for cutting the material, a guide pivotally mounted on the carriage for supporting the material, means for normally retaining the material out of cutting engagement with the cutting means during the reciprocation of the carriage, and preset electromagnetically controlled means for tilting the guide to project the material into engagement with the cutting means during a reciprocation of the carriage.

9. A machine for severing continuously moving material into lengths, comprising a stationary frame, track bars secured thereto, a carriage mounted to reciprocate on the track bars, means for reciprocating the carriage, means on the carriage for cutting the material, a guide pivotally mounted on the carriage for supporting the material, means for normally retaining the material out of cutting engagement with the cutting means during the reciprocation of the carriage, and preset electromagnetically controlled means for tilting the guide to project the material into engagement with the cutting means during a reciprocation of the carriage, and resilient means for returning the guide to its normal position after the cutting operation.

10. A machine for severing continuously moving material into lengths, comprising a stationary frame, track bars secured thereto, a carriage mounted to reciprocate on the track bars, means for reciprocating the carriage, a continuously rotating saw mounted on the carriage, a guide pivotally mounted on the carriage for supporting the material, means for normally retaining the material out of cutting engagement with the rotating saw during the reciprocation of the carriage, a cam lever electromagnetically and resiliently controlled having means mounted thereon for tilting the guide to project the material into cutting engagement with the saw during a reciprocation of the carriage, and cam actuated means for returning the cam lever to its initial position.

11. A machine for severing continuously moving pipe or the like into lengths comprising a stationary frame, track bars secured thereto, a carriage mounted to reciprocate on the track bars, means for reciprocating the carriage, a continuously rotating saw mounted on the carriage, a guide pivotally mounted on the carriage for supporting the moving pipe, means for normally retaining the moving pipe out of cutting engagement with the continuously rotating saw during the reciprocation of the carriage, a cam lever electromagnetically controlled having means mounted thereon for tilting the guide to project the pipe into cutting engagement with the saw during a reciprocation of the carriage, cam actuated means for returning the cam lever to its initial position, and resilient means for returning the guide to its normal position after the cutting operation.

12. A machine for severing continuously moving pipe or the like into lengths, comprising a stationary frame, track bars secured thereto, a carriage mounted to reciprocate on the track bars, means for reciprocating the carriage, a continuously rotating saw mounted on the carriage, a guide for the moving pipe supported on a swinging arm pivotally mounted on the carriage, a cam roller on the swinging arm, a cam lever journaled in a stationary frame member adjacent to the carriage, a cam on the cam lever for engaging the cam roller, a latch for normally holding the cam out of the path of the cam roller during the reciprocation of the carriage, electromagnetically controlled means for releasing the latch, resilient means for swinging the cam into the path of the cam roller for tilting the guide to project the pipe into cutting engagement with the saw during a reciprocation of the carriage, and a stop for limiting the swinging movement of the cam lever.

13. A machine for severing continuously moving pipe or the like into lengths, comprising a stationary frame, track bars secured thereto, a carriage mounted to reciprocate on the track bars, means for reciprocating the carriage, a continuously rotating saw mounted on the carriage, a swinging arm pivoted centrally to the carriage, a guide for supporting the moving pipe attached to the upper end of the swinging arm, a cam roller mounted in the lower end of the swinging arm, a cam lever journaled at one end in a stationary frame member adjacent to the carriage, a cam attached to the movable end of the cam lever for engaging the cam roller, a pawl extending from the cam lever, a latch for engaging the pawl for normally holding the cam in a lowered position out of engagement with the cam roller during the reciprocation of the carriage, electromagnetically controlled means for releasing the latch from the pawl, resilient means for raising the cam into the path of the cam roller to tilt the guide and project the pipe into cutting engagement with the saw during a reciprocation of the carriage, and cam actuated means for returning the cam lever to its normal position.

14. A machine for severing continuously moving pipe or the like into lengths, comprising a stationary frame, track bars secured thereto, a carriage mounted to reciprocate on the track bars, means for reciprocating the carriage, a continuously rotating saw mounted on the carriage, a swinging arm pivoted centrally to the carriage, a guide for supporting the moving pipe attached to the upper end of the swinging arm, a cam roller mounted in the lower end of the swinging arm, a cam lever journaled at one end in a stationary frame member adjacent to the carriage, a cam attached to the movable end of the cam lever for engaging the cam roller, a pawl extending downwardly from the journaled end of the cam lever, a spring pressed latch for engaging the pawl for normally holding the cam in a lowered position out of engagement with the cam roller during the reciprocation of the carriage, electromagnetically controlled means for releasing the latch from the pawl, resilient means for raising the cam into the path of the cam roller to tilt the guide and project the pipe into cutting engagement with the saw during a reciprocation of the carriage, a pair of spaced lever arms extending from the journaled end of the cam lever, a cam roller at the upper ends of the lever arms, a rotating cam for engaging said cam roller for returning the cam lever to its normal position, and resilient means for returning guide for the moving pipe to its initial position.

15. A machine for severing continuously moving pipe or the like into lengths, comprising a stationary base, a pair of end frames mounted thereon, track bars secured thereto, a carriage mounted to reciprocate on the track bars, means for reciprocating the carriage, a continuously rotating saw mounted on the carriage for cutting the pipe, a swinging arm pivoted centrally to the carriage, a guide secured to the upper end of the swinging arm for supporting the pipe, a cam roller mounted in the lower end of the swinging arm, a frame member mounted on the stationary base between the pair of end frames, a cam lever having one end pivoted in journal bearings on the frame member, a cam mounted on the movable end of the cam lever, a pawl extending from the pivoted end of the cam lever, a latch for engaging the pawl having resilient means for normally holding the cam out of the path of the cam roller during the reciprocation of the carriage, electromagnetically controlled means for releasing the latch from the pawl, resilient means for moving the cam into the path of the cam roller during a stroke of the carriage, a stop for limiting the movement of the cam lever, a pair of spaced lever arms extending from the pivoted end of the cam lever, a cam roller at the upper end of the lever arms, a rotating cam for engaging the said cam roller for moving the cam on the cam lever out of the path of the cam roller on the swinging arm, and resilient means for returning the swinging arm and guide to the normal position.

16. A machine for severing continuously moving pipe or the like into lengths, comprising a stationary frame, track bars secured thereto, a carriage mounted to reciprocate on the track bars, a rotating saw mounted on the carriage, means for reciprocating the carriage, means for indicating the relative speeds of the carriage and the moving pipe, means for synchronizing the speed of the carriage with the moving pipe, a guide pivotally attached to the carriage for supporting the moving pipe, means for normally retaining the moving pipe out of cutting engagement with the continuously rotating saw during the reciprocation of the carriage, electrically and resiliently controlled means for tilting the guide to protect the pipe into cutting engagement with the saw, and means for returning the guide to its normal position after the cutting operation.

17. A machine for severing continuously moving pipe or the like into lengths, comprising a stationary frame, track bars secured thereto, a carriage having pairs of wheels at the top and bottom of each end for engaging the track bars, means for reciprocating the carriage on the track bars, a continuously rotating saw mounted on the carriage, means for adjusting the speed of the carriage, means for synchronizing the speed of the carriage with the moving pipe, a guide pivotally attached to the carriage for supporting the moving pipe, means for retaining the moving pipe out of cutting engagement with the continuously rotating saw during a plurality of reciprocations of the carriage in succession, preset electrically controlled means for tilting the guide to project the pipe into cutting engagement with the saw, and resilient means for returning the guide to its normal position after the cutting operation.

18. A machine for severing continuously moving pipe or the like into lengths, comprising a stationary frame, track bars secured thereto, a carriage having wheels engaging the track bars, driving means for reciprocating the carriage, a saw mounted on the carriage, means for continuously rotating the saw, a rocking lever mounted adjacent to the carriage, a pitman having its ends pivoted to the carriage and the rocking lever, means for adjusting the pivoted end of the pitman on the rocking lever to vary the stroke of the reciprocating carriage, a rod connecting the driving means with the rocking lever, means for varying the stroke between the driving means and the rocking lever, a guide pivotally attached to the carriage for supporting the moving pipe, means for normally retaining the moving pipe out of cutting engagement with the continuously rotating saw during each reciprocation of the carriage, and preset electrically actuated means for tilting the guide to project the pipe into cutting engagement with the saw during a reciprocation of the carriage.

19. A machine for severing continuously moving pipe or the like into lengths, comprising a stationary frame, track bars secured thereto, a carriage mounted on the track bars, means for reciprocating the carriage, means for adjusting the stroke of the carriage, a continuously rotating saw mounted on the carriage, a guide pivotally attached to the carriage for supporting the moving pipe, means for normally retaining the moving pipe out of cutting engagement with the continuously rotating saw during each reciprocation of the carriage, means for tilting the guide to project the pipe into cutting engagement with the saw during a reciprocation of the carriage, means for synchronizing the movement of the pipe with the carriage during the cutting operation, and means for automatically controlling the lengths of pipe cut.

20. A machine for severing continuously moving pipe or the like into lengths, comprising a stationary frame, track bars secured thereto, a carriage mounted to reciprocate on the track bars, a continuously rotating saw mounted on the carriage, means for automatically moving the pipe into cutting engagement with the saw during a reciprocation of the carriage, a motor having a connection with driving gearing for reciprocating the carriage, a rocking lever having trunnion extensions at its lower end journaled in bearings mounted between the driving gearing and the carriage, a connecting rod between the driving gearing and the rocking lever, a pitman rod connecting the carriage with the rocking lever, a screw-threaded rod journaled in the rocking lever having a beveled gear secured to its lower end, a block screw-threaded to engage the screw-threaded rod, a pivotal connection between one end of the pitman rod and the adjustable block, a shaft journaled in the trunnion extensions having a brake disk keyed to one end and a beveled gear at an intermediate point meshing with the beveled gear on the lower end of the screw-threaded rod, a motor for adjusting the block to change the stroke of the carriage having a shaft, a brake disk keyed to the motor shaft adjacent to the brake disk on the end of the shaft journaled in the trunnion extensions, interlocking jaws extending from the brake disks, said jaws on one disk spaced far enough apart from the jaws on the adjacent disk to allow the rocking lever to swing its maximum stroke and form a lost motion connection between the rocking lever and the motor during the normal reciprocation of the carriage.

21. A machine for severing a continuously moving pipe or the like into predetermined lengths in sequence, comprising a stationary frame, track bars secured thereto, a continuously reciprocating carriage mounted on the track bars, a motor for reciprocating the carriage mounted adjacent thereto, a worm driven by the motor meshing with a worm wheel mounted on a tubular shaft journaled in a gear casing, a fixed shaft extending through the tubular shaft, a gear attached to the fixed shaft meshing with a pinion on a stub shaft adapted to travel in a concentric path around the fixed gear, said stub shaft having a crank extension adapted to travel in an eccentric path around the fixed gear, and a connection between the crank extension and the reciprocating carriage.

22. A machine for severing successively lengths of pipe or the like, comprising a stationary frame, track bars secured thereto, a carriage mounted to reciprocate on the track bars, a motor for reciprocating the carriage mounted adjacent thereto, a worm driven by the motor meshing with a worm wheel mounted on a tubular shaft journaled in a gear casing, a fixed shaft extending through the tubular shaft, a gear attached to one end of the fixed shaft meshing with a pinion on a stub shaft adapted to travel in a concentric path around the fixed gear, said stub shaft having a crank extension adapted to travel in an eccentric path around the fixed gear to synchronize the movement of the carriage with the pipe during the cutting operation, a connection between the crank extension and the reciprocating carriage, and adjusting means in the connection between the motor and the carriage for varying the stroke of the carriage.

23. A machine for severing a continuously moving pipe or the like into predetermined lengths in sequence, comprising a stationary frame, track bars secured thereto, a continuously reciprocating carriage mounted on the track bars, a rotating saw mounted on the carriage, a guide for supporting the moving pipe pivotally attached to the carriage, electromagnetically controlled means for tilting the guide to project the pipe into cutting engagement with the saw during a reciprocation of the carriage, a motor mounted adjacent to the carriage, a worm driven by the motor meshing with a worm wheel mounted on a tubular shaft journaled in the gear casing, a fixed shaft extending through the tubular shaft, a gear attached to the fixed shaft meshing with a pinion on a stub shaft adapted to travel in a concentric path around the fixed gear, said stub shaft having a crank extension adapted to travel in an eccentric path around the fixed gear, a rocking lever mounted between the driven gearing and the carriage, a rotatable threaded rod journaled in the rocking lever, an adjustable block carried by said rocking lever and screw-threaded to engage the said threaded rod, a rod connecting the rocking lever with the crank extension, a motor for rotating the screw-threaded rod to adjust the sliding block, and a lost motion connection between the motor and the rocking lever.

24. A machine for severing a continuously moving pipe or the like into lengths in sequence, comprising a stationary frame, track bars secured thereto, a carriage mounted on the track bars, a motor mounted adjacent thereto for reciprocating the carriage, a connection between the motor and the carriage, a guide for supporting the moving pipe pivotally connected to the carriage, adjusting means in the connection between the motor and the carriage for varying the stroke of the carriage, means for indicating the relative speeds of the carriage and the moving pipe in the guide, a saw mounted for rotation on the carriage, means for tilting the guide to project the pipe into cutting engagement with the saw, means for normally retaining the moving pipe out of cutting engagement with the continuously rotating saw during each reciprocation of the carriage, and means for synchronizing the movement of the carriage with the pipe during the cutting operation.

25. A machine for severing a continuously moving pipe or the like into lengths in sequence, comprising a stationary frame, track bars secured thereto, a continuously reciprocating carriage mounted on the track bars, a guide for supporting the moving pipe pivotally connected to the carriage, a cam engaging means for actuating the guide having a shaft mounted adjacent to the said guide, a limit switch having a shaft coupled to the cam shaft, a motor for reciprocating the carriage mounted adjacent thereto, a rotating saw mounted on the carriage, means for tilting the guide to project the pipe into cutting engagement with the saw during a reciprocation of the carriage, a worm driven by the motor meshing with a worm wheel mounted on a tubular shaft journaled in the gear casing, a fixed shaft extending through the tubular shaft, a gear secured to the fixed shaft adapted to travel in a concentric path around the fixed gear, said stub shaft having a crank extension adapted to travel in an eccentric path around the fixed gear, a connection between the crank extension and the reciprocating carriage, a beveled gear keyed to the tubular shaft meshing with a gear on a shaft journaled in bearings mounted in the gear casing, and means connecting said shaft in the gear casing to the shafts for the cam and limit switch for controlling the saw cut.

26. A machine for severing continuously moving pipe or the like into lengths, comprising a stationary frame, track bars secured thereto, a carriage mounted to reciprocate on the track bars, means for reciprocating the carriage, a rotating saw mounted on the carriage, a swinging arm pivotally secured to the carriage, a guide mounted on the swinging arm for supporting the moving pipe, a cam roller carried by the swinging arm, a cam for engaging the cam roller for tilting the guide to project the pipe into cutting engagement with the saw during a reciprocation of the carriage, means for synchronizing the movement of the carriage with the pipe during the cutting operation, a latch for normally holding the cam out of engagement with the cam roller during the reciprocation of the carriage, and resilient means for moving the cam into the path of the cam roller during a reciprocation of the carriage.

27. A machine for severing a continuously moving pipe or the like into lengths, comprising a stationary frame, track bars secured thereto, a continuously reciprocating carriage mounted on the track bars, a rotating saw mounted on the carriage, a guide for supporting the moving pipe pivoted to the carriage, a motor mounted adjacent to the carriage, a worm driven by the motor meshing with a worm wheel mounted on a tubular shaft journaled in a gear casing, a fixed shaft extending through the tubular shaft, a gear attached to the fixed shaft meshing with a pinion mounted on a stub shaft adapted to travel in a concentric path around the fixed gear, a crank extending from the stub shaft, a connection between the carriage and the crank extension, said crank extension adapted to travel in an eccentric path around the fixed gear to give a variable speed to the carriage and synchronize its movement with the pipe during the cutting operation, and means for tilting the guide to project the pipe into cutting engagement with the saw during a reciprocation of the carriage.

28. A machine for severing a continuously moving pipe or the like into lengths, comprising a stationary frame, track bars secured thereto, a continuously reciprocating carriage mounted on the track bars, a rotating saw mounted on the carriage, a guide supporting the moving pipe pivoted to the carriage, a motor mounted adjacent to the carriage connected with means for reciprocating the carriage and to synchronize the movement of the carriage with the pipe during the cutting operation, means for normally retaining the moving pipe out of cutting engagement with the rotating saw during each reciprocation of the carriage, and electrically controlled means actuated by the motor for tilting the guide to project the pipe into cutting engagement with the saw during a reciprocation of the carriage.

29. A machine for severing continuously moving pipe or the like, comprising a stationary frame, a carriage mounted to reciprocate therein, a continuously rotating saw mounted on the carriage, a motor mounted adjacent thereto for reciprocating the carriage, gearing driven by the motor, a rocking lever mounted between the motor and the carriage, a screw-threaded rod journaled in the rocking lever, an adjustable block screw-threaded to engage the screw-threaded rod, a pitman having its ends pivotally connected to the carriage and the adjustable block, a motor geared to the threaded rod for raising or lowering the adjustable block to vary the stroke of the carriage, a lost motion device interposed in the connection between the motor and the threaded rod to allow movement of the rocking lever independent of the motor, a pipe guide disposed parallel to the direction of the path of travel of the reciprocating carriage and pivoted thereto, means for tilting the pipe guide to project the pipe into cutting engagement with the saw, means for synchronizing the movement of the carriage with the pipe during the cutting operation, and means for returning the guide to its initial position.

30. A machine for severing continuously moving pipe or the like into lengths, comprising a stationary frame, track bars secured thereto, a carriage mounted to reciprocate on the track bars, means for adjusting the stroke of the carriage, a rotating saw mounted on the carriage, a guide for the pipe pivoted to the carriage, means for tilting the guide to project the pipe into cutting engagement with the saw during a reciprocation of the carriage, means for normally retaining the moving pipe out of cutting engagement with the rotating saw during each reciprocation of the carriage, means for synchronizing the movement of the pipe with the carriage during the cutting operation, a dial for indicating in feet and inches the length of the pipe cut, and means for automatically controlling the dial to indicate the length of the pipe cut.

RICHARD H. STEVENS.
TOM WILSON.

REFERENCES CITED

The following references are of record in the file of this patent:

UNITED STATES PATENTS

| Number | Name | Date |
|---|---|---|
| 1,367,564 | Pritchard | Feb. 8, 1921 |
| 1,681,306 | Moon | Aug. 21, 1928 |
| 1,946,926 | Barton | Feb. 13, 1934 |
| 1,947,399 | Umansky | Feb. 17, 1934 |
| 2,079,974 | Traut | May 11, 1937 |
| 558,646 | Hardie | Apr. 21, 1896 |
| 1,075,274 | Smith | Oct. 7, 1913 |
| 1,418,437 | Grupe | June 2, 1922 |
| 1,996,617 | Hahn | Apr. 2, 1935 |